US011851108B2

(12) United States Patent
Nydam et al.

(10) Patent No.: US 11,851,108 B2
(45) Date of Patent: Dec. 26, 2023

(54) VEHICLE STRUT BRACE APPARATUS

(71) Applicant: Ford Global Technologies, LLC, Dearborn, MI (US)

(72) Inventors: Scott Nydam, Farmington Hills, MI (US); Aref Vandadi, Ann Arbor, MI (US); Ari Garo Caliskan, Canton, MI (US); Stavros Melabiotis, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/741,742

(22) Filed: May 11, 2022

(65) Prior Publication Data

US 2023/0365197 A1  Nov. 16, 2023

(51) Int. Cl.
*B62D 25/08* (2006.01)

(52) U.S. Cl.
CPC ......... *B62D 25/088* (2013.01); *B62D 25/082* (2013.01)

(58) Field of Classification Search
CPC .............................. B62D 25/088; B62D 25/082
USPC ................................................... 296/203.02
See application file for complete search history.

(56) References Cited

U.S. PATENT DOCUMENTS

| 3,941,115 A | 3/1976 | Tshida et al. |
| 5,411,311 A | 5/1995 | Shimmell et al. |
| 7,287,614 B2 * | 10/2007 | Chernoff .............. B62D 25/105 |
| | | 180/69.2 |
| 7,509,935 B2 | 3/2009 | Vincer et al. |
| 8,302,718 B2 | 11/2012 | Tottori |
| 8,783,760 B2 * | 7/2014 | Van Kaam ........... B60G 15/068 |
| | | 296/203.02 |
| 9,126,633 B2 | 9/2015 | Cho et al. |
| 2008/0098979 A1 | 5/2008 | Vincer et al. |
| 2013/0146376 A1 * | 6/2013 | Nam .................... B60K 11/085 |
| | | 180/68.1 |
| 2015/0266513 A1 * | 9/2015 | Riedl ................... B62D 25/085 |
| | | 296/203.02 |
| 2015/0314810 A1 * | 11/2015 | Watanabe .............. B62D 21/11 |
| | | 296/203.02 |
| 2021/0253177 A1 | 8/2021 | Yamauchi et al. |

FOREIGN PATENT DOCUMENTS

| DE | 102014110389 | | 1/2016 | |
| DE | 102014110389 A1 * | 1/2016 | .......... B62D 25/082 |
| DE | 102017005017 A1 * | 3/2018 | |
| DE | 102017216226 A1 * | 3/2019 | ............. F01N 13/00 |
| WO | 2012025569 | | 3/2012 | |

* cited by examiner

*Primary Examiner* — Pinel E Romain
(74) *Attorney, Agent, or Firm* — Lorne Forsythe; HANLEY, FLIGHT & ZIMMERMAN LLC

(57) ABSTRACT

Vehicle strut braces are disclosed. An example apparatus includes a strut brace including a first portion to removably couple to a cowl of a vehicle, a second portion to removably couple to a first shock tower on a first side of the vehicle and a second shock tower on a second side of the vehicle, and a third portion to removably couple to at least one of (i) a first longitudinal member on the first side of the vehicle and a second longitudinal member on the second side of the vehicle or (ii) an upper front rail on the first side of the vehicle and the second side of the vehicle, the third portion to traverse an axial centerline of the vehicle.

19 Claims, 5 Drawing Sheets

VEHICLE STRUT BRACE APPARATUS

FIELD OF THE DISCLOSURE

This disclosure relates generally to vehicles and, more particularly, to vehicle strut brace apparatus.

BACKGROUND

Certain vehicular maneuvers, such as cornering or high-speed turning, can cause a chassis of a vehicle to encounter a torsional load. As a result, the chassis may flex and cause handling to become less predictable for a driver. For instance, wheels on one side of the vehicle may exert less force on a riding surface and, in turn, lose grip strength when the chassis deforms or deflects in response to encountering a load. Some vehicles include a strut brace or bar to help distribute loads and improve control of the vehicle.

BRIEF DESCRIPTION OF THE DRAWINGS

In general, the same reference numbers will be used throughout the drawing(s) and accompanying written description to refer to the same or like parts. The figures are not to scale.

Figure 1:
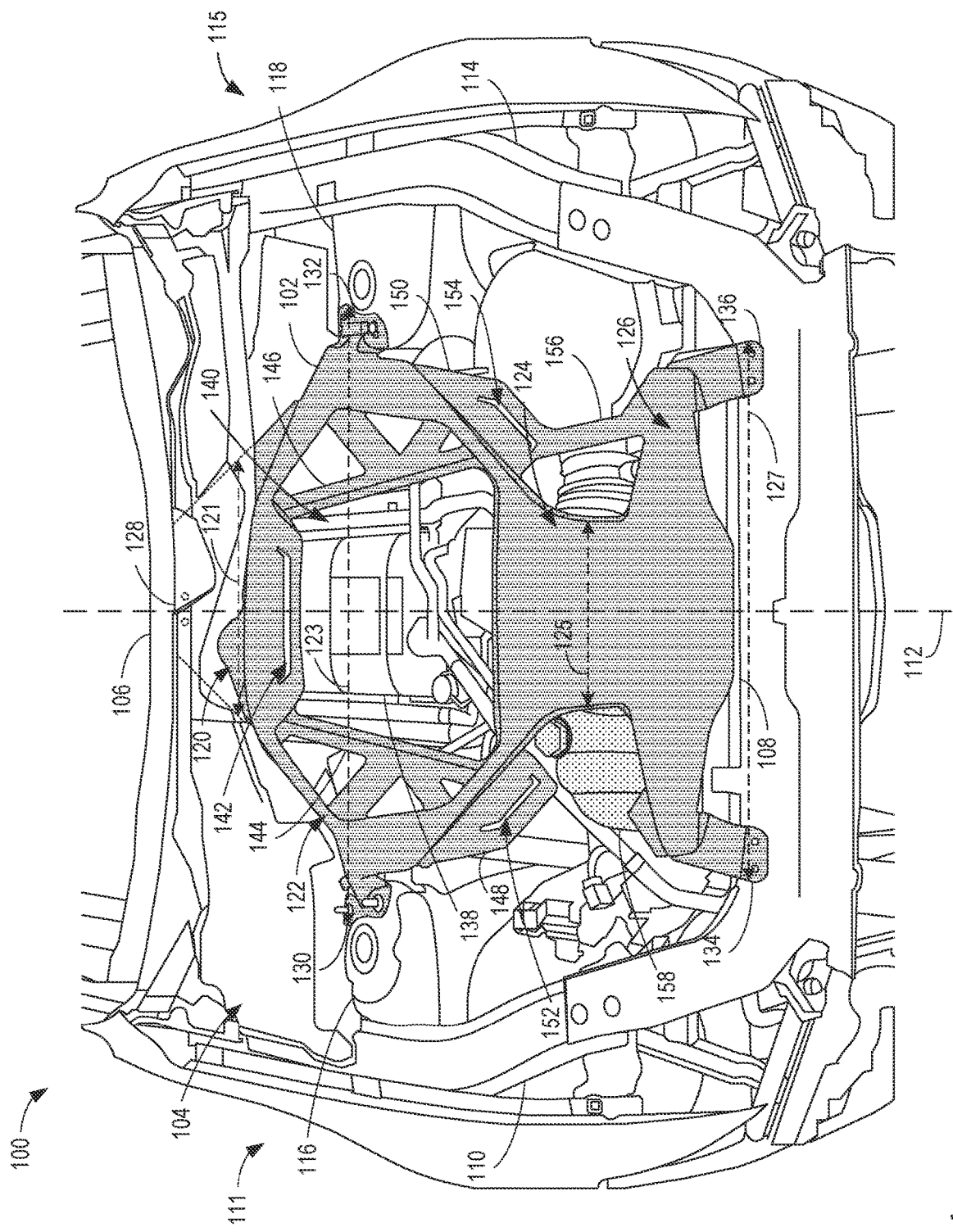
FIG. 1 illustrates a first example strut brace mounted in a vehicle.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Disclosed herein are example vehicle strut brace apparatus. Traditionally, vehicles have included strut braces or strut bars to provide support against torsional loads and/or imbalanced loads (e.g., an increased load on one side of the vehicle). For example, a chassis or body of a vehicle may encounter a torsional load in response to performing certain maneuvers, such as high-speed turning or cornering. Specifically, during a high-speed right turn, a left tire can create a friction force with the ground that causes the vehicle to move rightward. However, the friction force and inertia create a moment that causes the chassis to encounter a torque that shifts a weight of the vehicle towards a left side of the vehicle. Further, as the weight shifts toward the left side of the vehicle, a right tire is unable to create as much friction with the ground, which causes the right tire to lose grip.

To help distribute forces encountered during certain maneuvers, known strut braces or bars couple to shock towers (e.g., strut towers) on opposite sides of the vehicle. Shock towers are reinforced portions of inner wheel wells of a vehicle. As such, the strut bar can pass the force encountered by one shock tower towards the other shock tower to distribute the force to both sides and, in turn, increase a rigidity of the vehicle. However, the weight shift in the vehicle may not be limited to an area near the shock tower. Moreover, an effectiveness of the force distribution provided by the strut brace may be limited by an area across which the strut brace is able to convey the load towards a longitudinal centerline or an opposite side of the vehicle to counteract the encountered torque. For instance, a rigidity of the chassis can increase with an area over which the strut brace distributes the load. Additionally, having a strut brace or bar extend across the under-hood compartment can interfere with components in the under-hood compartment and/or cause the vehicle to be less aesthetically pleasing. For instance, the strut brace may not match an appearance of the rest of the under-hood compartment and/or cause the under-hood compartment to appear cluttered and disorganized.

Examples disclosed herein provide strut brace apparatus to improve stiffnesses of a vehicle chassis and provide coverage for certain components (e.g., wires, tubes, tanks, etc.) in an under-hood compartment of a vehicle. Specifically, the example strut brace apparatus include five distinct mounting points in the under-hood compartment that can span between a front and a rear of the under-hood compartment to provide increased support against torsional and/or imbalanced loads encountered by the vehicle chassis. As a result, the example strut brace can prevent or otherwise reduce flex in the vehicle chassis and, in turn, improve vehicle handling and/or steering feeling.

An example strut brace disclosed herein includes a first portion (e.g., a rear portion) to removably couple to a cowl of a vehicle. Further, the example strut brace includes a second portion (e.g., a middle portion, an intermediate portion, etc.) to removably couple to a first shock tower on a first side of the vehicle (e.g., a right shock tower) and a second shock tower on a second side of the vehicle (e.g., a left shock tower). Additionally, the example strut brace includes a third portion (e.g. a front portion) that traverses an axial centerline (e.g., a longitudinal centerline) of the vehicle. In some examples, the third portion is to removably couple to an upper front rail (e.g., a radiator support) on the first side of the vehicle and the second side of the vehicle. In some examples, the third portion of the example strut brace is to removably couple to a first longitudinal member on the first side of the vehicle (e.g., a right longitudinal member) and a second longitudinal member on the second side of the vehicle (e.g., a left longitudinal member). Specifically, the first and second longitudinal members can define portions of a vehicle frame or subframe that extend in a vehicle longitudinal direction on opposite sides of the vehicle.

As such, the five distinct mounting locations of the example strut brace span throughout a length of the under-hood compartment of the vehicle to improve a rigidity of the chassis along an increased length of the vehicle. Thus, the example strut brace can redistribute forces encountered by the chassis on one side (e.g., a right side) to another side (e.g., a left side) over an increased area and, in turn, provide improved resistance against chassis flex that can occur in response to hitting a bump on one side and/or performing certain vehicular maneuvers, such as turning.

Additionally, the example strut brace covers (e.g., is positioned over) certain components (e.g., wires, tubes, tanks, etc.) in the under-hood compartment to improve an appearance of the vehicle under the hood. Specifically, the example strut brace can cover and restrict access to components in the under-hood compartment for which car owner access is typically not needed or advisable and that would otherwise cause the under-hood compartment to appear crowded and/or disorganized. Further, the example strut brace provides space for access to components for which occasional access or inspection is needed or generally permitted, such as a coolant overflow tank, an oil dipstick, a battery, etc. In some examples, the example strut brace can include at least one openable or removable cover plate over certain portions of the under-hood compartment to allow easy access to components underneath for modifications and/or replacements while covering such components when modifications and/or replacements are not being performed. As such, the example strut brace can improve an organization and, thus, an aesthetic of the vehicle while avoiding obstructing access to certain components.

FIG. 1 illustrates a vehicle 100 including a first example first strut brace 102 installed in an under-hood compartment 104. The vehicle 100 includes a cowl 106 defining a rear of the under-hood compartment 104 and an upper front rail 108 (e.g., a radiator support) defining a front of the under-hood compartment 104. The cowl 106 houses a wiper arm linkage and can include vents to enable fresh air to enter into a cabin of the vehicle 100. The upper front rail 108 can be part of a vehicle subframe. In particular, the upper front rail provides support for certain components in the vehicle 100, such as a radiator.

Further, the vehicle 100 includes a first longitudinal member 110 (e.g., a right longitudinal member) on a first side 111 of a longitudinal centerline 112 (e.g., a passenger side) of the vehicle 100. Additionally, the vehicle 100 includes a second longitudinal member 114 (e.g., a left longitudinal member) on a second side 115 of the longitudinal centerline 112 of the vehicle 100 (e.g., a driver side). Specifically, the first longitudinal member 110 and the second longitudinal member 114 define portions of a chassis or frame of the vehicle 100 that extend in a longitudinal direction defined by the vehicle 100.

Furthermore, the vehicle 100 includes a first shock tower 116 (e.g., a right shock tower, a first strut tower, etc.) on the first side 111 of the vehicle 100 and a second shock tower 118 (e.g., a left shock tower, a second strut tower, etc.) on the second side 115 of the vehicle 100. The first shock tower 116 and the second shock tower 118 can provide mounting points for shocks or struts that are operatively coupled to wheels of the vehicle 100. Specifically, the shocks or struts allow a vehicle suspension to absorb bumps and compensate for other irregularities in a riding surface.

In FIG. 1, the cowl 106, the upper front rail 108, the first longitudinal member 110, the second longitudinal member 114, the first shock tower 116, and/or the second shock tower 118 can help bear loads encountered by the vehicle 100. However, in certain dynamic states, the loads can cause the cowl 106, the upper front rail 108, the first longitudinal member 110, the second longitudinal member 114, the first shock tower 116, the second shock tower 118, and/or, more generally, the chassis of the vehicle 100 to encounter deformation and/or deflection. In FIG. 1, the first strut brace 102 can help distribute loads and, in turn, stiffen a front portion of the vehicle 100 to improve a torsional rigidity thereof. As such, the first strut brace 102 helps prevent the chassis of the vehicle 100 from flexing and, thus, improves a predictability of handling associated with the vehicle 100.

In the illustrated example of FIG. 1, the first strut brace 102 includes a rear portion 120, a rear-middle portion 122, a front-middle portion 124, and a front portion 126. The rear portion 120 includes a first mounting point 128 removably coupled to the cowl 106. In some examples, the first mounting point 128 straddles the longitudinal centerline 112 of the vehicle 100. In some examples, the rear portion 120 extends transversely along the cowl with opposite sides of the first mounting point 128 equidistant from the longitudinal centerline 112. For example, a first side of the first mounting point 128 can be separated from the longitudinal centerline 112 by a first distance on the first side 111, and a second side of the first mounting point 128 can be separated from the longitudinal centerline 112 by the first distance on the second side 115. In some examples, the rear portion 120 is removably coupled to the cowl 106 in more than one location on the first side 111 of the vehicle 100. Similarly, the rear portion 120 can be removably coupled to the cowl 106 in more than one location on the second side 115 of the vehicle 100.

The rear-middle portion 122 includes a second mounting point 130 removably coupled to the first shock tower 116. Additionally, the rear-middle portion 122 includes a third mounting point 132 removably coupled to the second shock tower 118. In FIG. 1, the front portion 126 includes a fourth mounting point 134 removably coupled to the upper front rail 108 on the first side 111 of the vehicle 100. Additionally, the front portion 126 includes a fifth mounting point 136 removably coupled to the upper front rail 108 on the second side 115 of the vehicle 100. Accordingly, the front portion 126 extends transversely along the upper front rail 108. As shown in the illustrated example of FIG. 1, the fourth mounting point 134 and the fifth mounting point 136 are positioned closer than the second mounting point 130 and the third mounting point 132 to the longitudinal centerline 112. Additionally or alternatively, the front portion 126 can be removably coupled to the first longitudinal member 110 and the second longitudinal member 114, as discussed further in association with FIG. 4.

In FIG. 1, the rear portion 120 includes a first width 121. Further, the rear-middle portion 122 includes a second width 123 greater than the first width 121. Accordingly, the first strut brace 102 extends longitudinally forward and laterally outward from the rear portion 120 to the rear-middle portion 122. The front-middle portion 124 includes a third width 125 smaller than the first width 121 and the second width 123. That is, the first strut brace 102 extends longitudinally forward and laterally inward from the rear-middle portion 122 to the front middle portion 124. Additionally, the front portion 126 includes a fourth width 127 greater than the first width 121 and the third width 125 but smaller than the second width 123. As such, the first strut brace 102 extends longitudinally forward and laterally outward from the front-middle portion 124 to the front portion 126. The respective widths 121, 123, 125, 127 of the rear portion 120, the rear-middle portion 122, the front-middle portion 124, and the front portion 126 enable the first strut brace 102 to provide the vehicle with a torsional rigidity at a reduced weight. Additionally, the respective widths 121, 123, 125, 127 of the rear portion 120, the rear-middle portion 122, the front-middle portion 124, and the front portion 126 enable the first strut brace 102 to cover certain components to improve an appearance of the under-hood compartment 104.

In FIG. 1, the front-middle portion 124 traverses the longitudinal centerline 112 of the vehicle 100 and connects the rear-middle portion 122 to the front portion 126. Specifically, the front-middle portion 124 enables a first direct load path to be defined across the longitudinal centerline 112 between the second mounting point 130 and the fifth mounting point 136. Additionally, the front-middle portion 124 enables a second direct load path to be defined across the longitudinal centerline 112 between the third mounting point 132 and the fourth mounting point 134. As such, the first direct load path and the second direct load path intersect. Accordingly, the front-middle portion 124 enables loads to be distributed between the first shock tower 116 and a first portion of the upper front rail 108 on the second side 115 of the vehicle 100 (e.g., a left portion of the upper front rail 108). Similarly, the front-middle portion 124 enables loads to be distributed between the second shock tower 118 and a second portion of the upper front rail 108 on the first side 111 of the vehicle 100 (e.g., a right portion of the upper front rail 108). Thus, by defining direct load paths between the shock towers 116, 118 and the upper front rail 108, the first strut brace 102 can improve a torsional rigidity of the vehicle 100. That is, the front-middle portion 124 of the first strut brace 102 enables a load encountered by the first shock tower 116 and/or the second shock tower 118 to be distributed to the opposite side of the vehicle 100 at a front of the vehicle 100. As such, the first strut brace 102 enables a torsional load encountered by the chassis of the vehicle 100 to be distributed to an opposite side of the vehicle 100 over an increased area and, in turn, enables the load to be dispersed while minimizing or otherwise reducing an effect of the load on any particular area of the vehicle 100.

In FIG. 1, the rear portion 120, the rear-middle portion 122, and/or the front portion 124 can define a load path between the second mounting point 130 and the third mounting point 132. As such, the first strut brace 102 enables loads to be transferred between the first shock tower 116 and the second shock tower 118. Furthermore, the rear portion 120 defines direct load paths between the second mounting point 130 and the first mounting point 128 as well as between the third mounting point 132 and the first mounting point 128. Thus, the first strut brace 102 can distribute loads encountered by the first shock tower 116 towards the longitudinal centerline 112 and/or to an opposite side (e.g., the second side 115) of the vehicle 100 frontward of the first shock tower 116 (e.g., to the fifth mounting point 136), rearward of the first shock tower 116 (e.g., to the first mounting point 128), and/or even with the first shock tower 116 in a longitudinal direction defined by the vehicle 100 (e.g., to the third mounting point 132). Similarly, the first strut brace 102 can distribute loads encountered by the second shock tower 118 to an opposite side (e.g., the first side 111) of the vehicle 100 frontward of the second shock tower 118 (e.g., to the fourth mounting point 134), rearward of the second shock tower 118 (e.g., to the first mounting point 128), and even with the second shock tower 118 in the longitudinal direction defined by the vehicle 100 (e.g., to the second mounting point 130). Therefore, the first strut brace 102 can distribute the torsional loads encountered by the vehicle 100 throughout a front of the vehicle 100 to minimize or otherwise reduce flexure of the vehicle 100 in response to the torsional loads.

Furthermore, by distributing loads over a larger area (e.g., an area that corresponds with a longitudinal length of the under-hood compartment 104), the first strut brace 102 can provide the vehicle 100 with torsional rigidity at a reduced weight compared to some known strut braces. Specifically, dispersing the loads throughout a length of the under-hood compartment 104 enables the first strut brace 102 to include a reduced thickness and/or a lighter material while providing the chassis of the vehicle 100 with a torsional rigidity that prevents or otherwise minimizes flexure of the chassis during certain maneuvers, such as high speed turning or cornering. In some examples, the first strut brace 102 includes a composite material or a metal (e.g., cast magnesium, steel, aluminum, etc.). In some examples, the first strut brace 102 is formed via additive manufacturing, injection molding, machine stamping, casting, extrusion, or any other manufacturing process.

In the illustrated example of FIG. 1, the vehicle 100 further includes an engine 138. In FIG. 1, the first strut brace 102 includes an opening 140 to enable access to the engine 138 of the vehicle 100. Accordingly, the opening 140 enables the first strut brace 102 to cover components in the under-hood compartment 104 around the engine 138 while avoiding interfering with a dissipation of heat from the engine 138 and/or access to the engine 138 for inspections. Additionally, the first strut brace 102 includes a first slot 142 to aid in heat dissipation for components in the under-hood compartment 104 covered by the rear portion 120 and/or the rear-middle portion 122 of the first strut brace 102.

Furthermore, the first strut brace 102 includes a first bracket 144 (e.g., a first K-bracket) positioned on the first side 111 of the vehicle 100 and a second bracket 146 (e.g., a second K-bracket) positioned on the second side 115 of the vehicle 100. Specifically, the first and second brackets 144, 146 extend longitudinally across the opening 140 on the first and second sides 111, 115 of the vehicle 100, respectively. Furthermore, the first and second brackets 144, 146 are operatively coupled to the rear portion 120, the rear-middle portion 122, and the front-middle portion 124 of the first strut brace 102. In particular, the first and second brackets 144, 146 include rearward ends operatively coupled to the rear portion 120 of the first strut brace 102 and frontward ends operatively coupled to the front-middle portion 124 of the first strut brace 102. Further, the first and second brackets 144, 146 include lateral ends operatively coupled to the rear-middle portion 122 of the first strut brace 102. As a result, the brackets 144, 146 can provide the first strut brace 102 with additional stiffness between the rear portion 120, the rear-middle portion 122, and the front middle-portion 124. Moreover, the brackets 144, 146 can help distribute loads encountered by the first shock tower 116 and/or the second shock tower 118 across the first strut brace 102. For example, the first bracket 144 can help divert a load encountered by the first shock tower 116 towards the rear portion 120 of the first strut brace 102 (e.g., towards the first mounting point 128), towards the front portion 126 of the first strut brace 102 (e.g., towards the fifth mounting point 136), and/or towards the second shock tower 118 (e.g., towards the third mounting point 132). In some examples, the lateral ends of the first and second brackets 144, 146 are positioned frontward and rearward of the shock towers 116, 118 to aid in the load distribution across the first strut brace 102.

In the illustrated example of FIG. 1, the first strut brace 102 includes a first wing portion 148 on the first side 111 of the vehicle 100 (e.g., a right outboard portion relative to the longitudinal centerline 112) and a second wing portion 150 on the second side 115 of the vehicle 100 (e.g., a left outboard portion relative to the longitudinal centerline 112). For example, the first and second wing portions 148, 150 can be operatively coupled to the rear-middle portion 122 and/or the front-middle portion 124 on opposite sides of the vehicle 100. Further, the first and second wing portions 148, 150 can extend away from the longitudinal centerline 112 to cover components positioned outboard of the rear-middle portion 122 and/or the front-middle portion 124. As shown in FIG. 1, the first wing portion 148 and the second wing portion 150 can include respective slots 152, 154 to help covered components in the under-hood compartment 104 dissipate heat.

In FIG. 1, the second wing portion 150 includes a rail 156 to operatively couple the second wing portion 150 to the front portion 126 of the first strut brace 102. As such, the rail 156 can help increase a stiffness of the first strut brace 102 and, in turn, a rigidity of the chassis of the vehicle 100. In FIG. 1, the rail 156 is spaced apart from the front-middle portion 124 of the first strut brace 102. To enable a coolant tank 158 in the under-hood compartment 104 to be accessed without removing the first strut brace 102, the first wing portion 148 of the first strut brace 102 does not include a rail coupled to the front portion 126. In particular, a geometry of the first strut brace 102 can correspond with a layout of components in the under-hood compartment 104 such that the first strut brace 102 covers certain components (e.g., wires, tubes, etc.) while providing access to other components (e.g., the engine 138, the coolant tank 158, a battery, etc.). In some examples, the first strut brace 102 includes another rail to operatively couple the first wing portion 148 to the front portion 126 similar to the rail 156 of the second wing portion 150.

Figure 2:
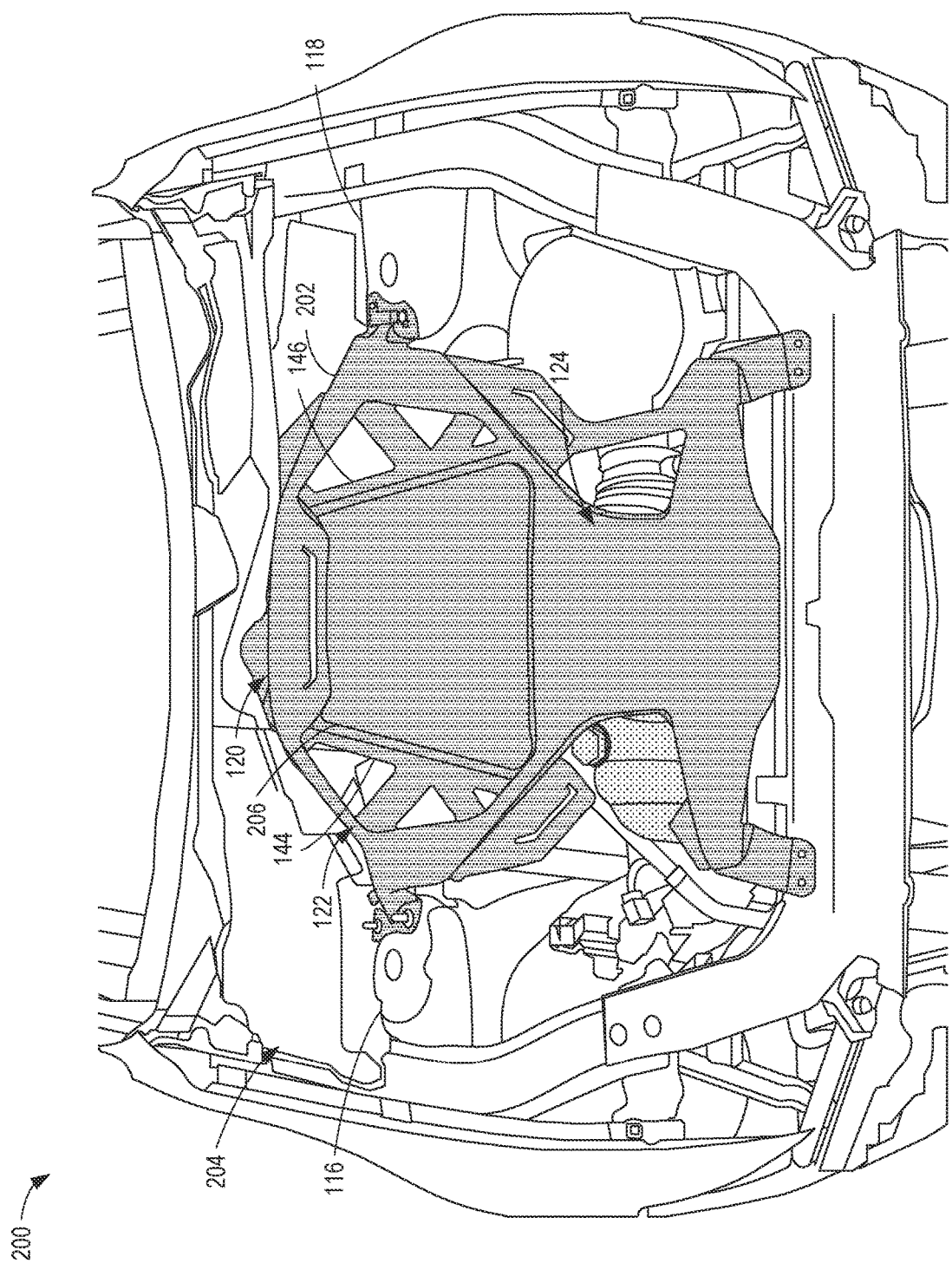
FIG. 2 illustrates a second example strut brace mounted in a vehicle.

FIG. 2 illustrates another vehicle 200 including a second example strut brace 202 mounted in an under-hood compartment 204. In the illustrated example of FIG. 2, the second strut brace 202 includes a plate 206 in place of the opening 140 of FIG. 1. Specifically, the plate 206 is operatively coupled to the rear portion 120, the front-middle portion 124 and the brackets 144, 146. As such, the plate 206 can help support loads between the first shock tower 116 and the second shock tower 118 and, thus, increase a torsional rigidity of the vehicle 200. Moreover, the plate 206 covers the engine 138 of FIG. 1. Thus, the second strut brace 202 provides an engine cover in addition to a cover for other components, such as wires, tubes, tanks, etc.

Figure 3:
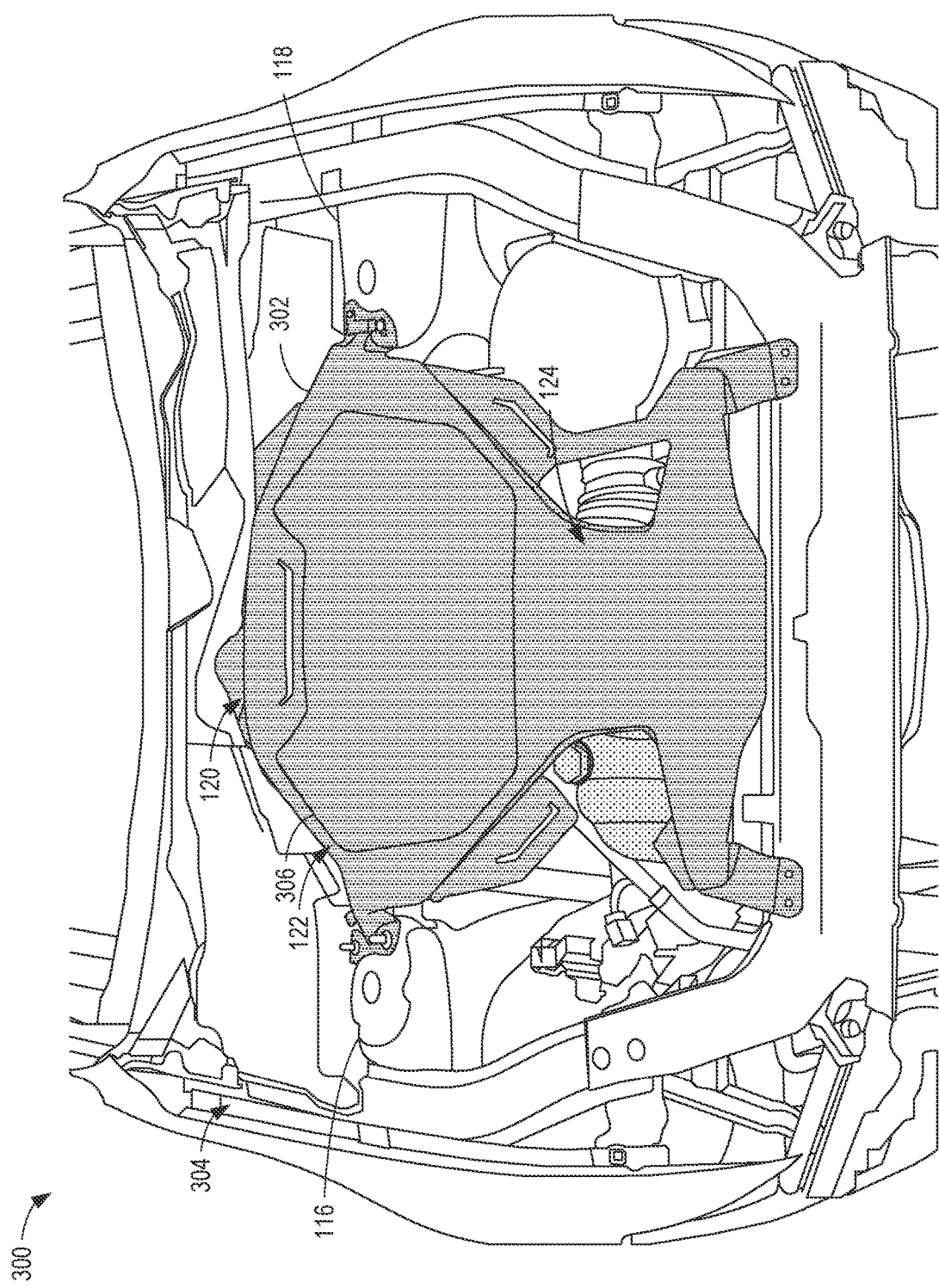
FIG. 3 illustrates a third example strut brace mounted in a vehicle.

FIG. 3 illustrates another vehicle 300 including a third example strut brace 302 mounted in an under-hood compartment 304. In FIG. 3, the third strut brace 302 includes a plate 306 that can help support loads between the first shock tower 116 and the second shock tower 118 similar to the plate 206 of the second strut brace 202 illustrated in FIG. 2. However, in FIG. 3, the plate 306 is operatively coupled to the rear-middle portion 122 in addition to the rear portion 120 and the front-middle portion 124. In turn, the plate 306 defines a direct load path between the first shock tower 116 and the second shock tower 118. Further, the plate 206 is positioned over the brackets 144, 146 of FIGS. 1-2 for increased load support. Alternatively, the plate 206 can replace the brackets 144, 146 of FIGS. 1-2 to reduce a weight of the third strut brace 302.

Figure 4:
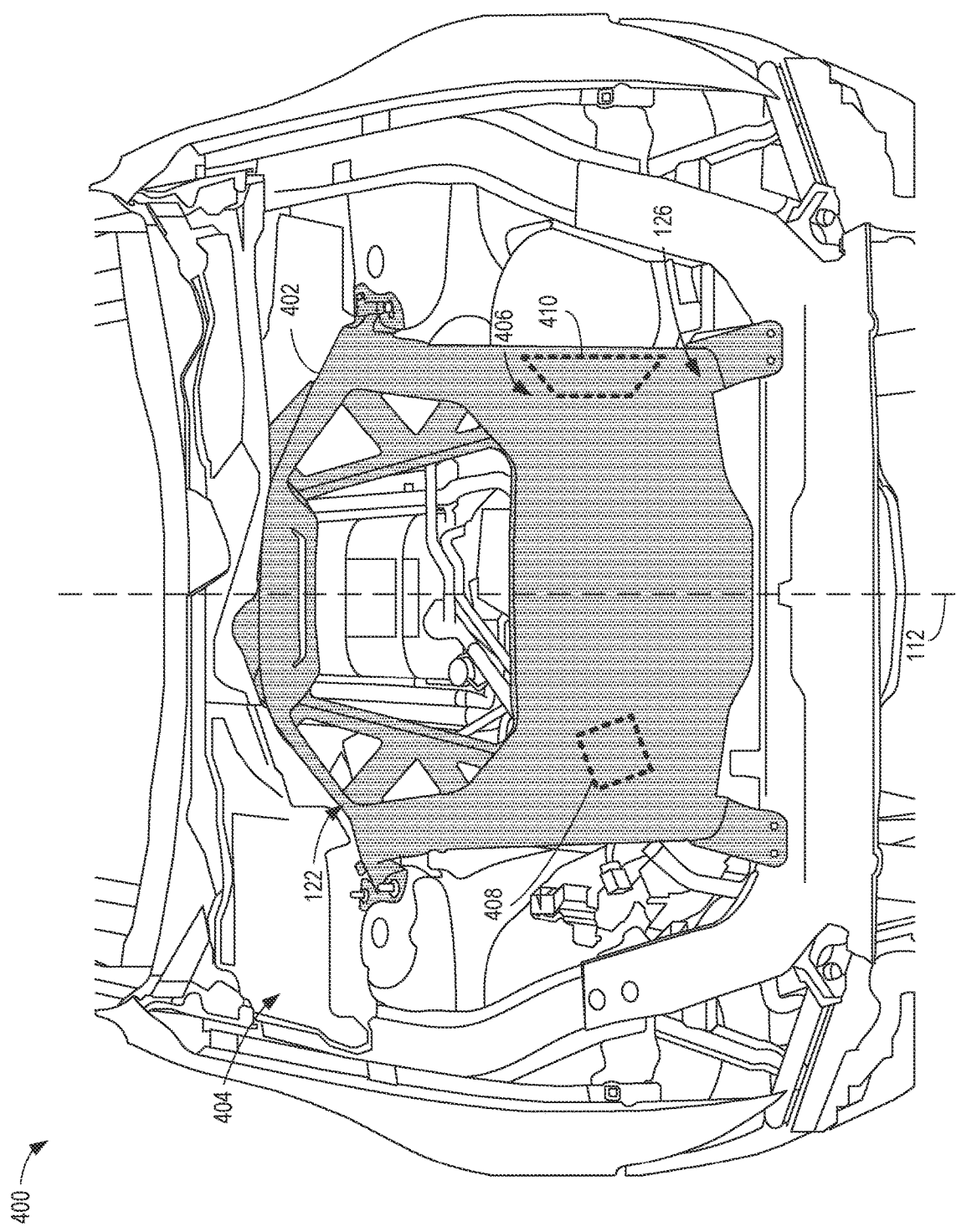
FIG. 4 illustrates a fourth example strut brace mounted in a vehicle.

FIG. 4 illustrates another vehicle 400 including a fourth example strut brace 402 mounted in an under-hood compartment 404. In FIG. 4, the fourth strut brace 402 includes a second example front-middle portion 406 between the front portion 126 and the rear-middle portion 122. In particular, the second front-middle portion 406 extends further outboard from the longitudinal centerline 112 compared to the front-middle portion 124 of FIG. 1. As such, the second front-middle portion 406 can cover more components in the under-hood compartment 404 positioned further from the longitudinal centerline 112.

In FIG. 4, to enable access to certain components, the fourth strut brace 402 includes a first cover plate 408 and a second cover plate 410 in the second front-middle portion 406. In FIG. 4, the first cover plate 408 covers the coolant tank 158 of FIG. 1 and the second cover plate 410 covers an air cleaner. The first and second cover plates 408, 410 are removable or openable to enable the coolant tank 158 and/or the air cleaner to be accessible without unmounting the fourth strut brace 402 from the under-hood compartment 404. For example, the cover plates 408, 410 can be operatively coupled to the second front-middle portion 406 via hinges at one end and via an interference fit at an opposite end such that the cover plates 408, 410 can rotate open about the hinges in response to the interference fit being disengaged. Additionally or alternatively, the first cover plate 408 and/or the second cover plate 410 can be operatively coupled to the second front-middle portion 406 via screws or bolts.

Although the illustrated example of FIG. 4 illustrates the cover plates 408, 410 covering the coolant tank 158 and the air cleaner, it should be understood that the cover plates 408, 410 can cover any other component in the under-hood compartment 404 positioned under the fourth strut brace 402. For example, the first cover plate 408 can cover a battery and the second cover plate 410 can cover an oil tank in the under-hood compartment 404.

Figure 5:
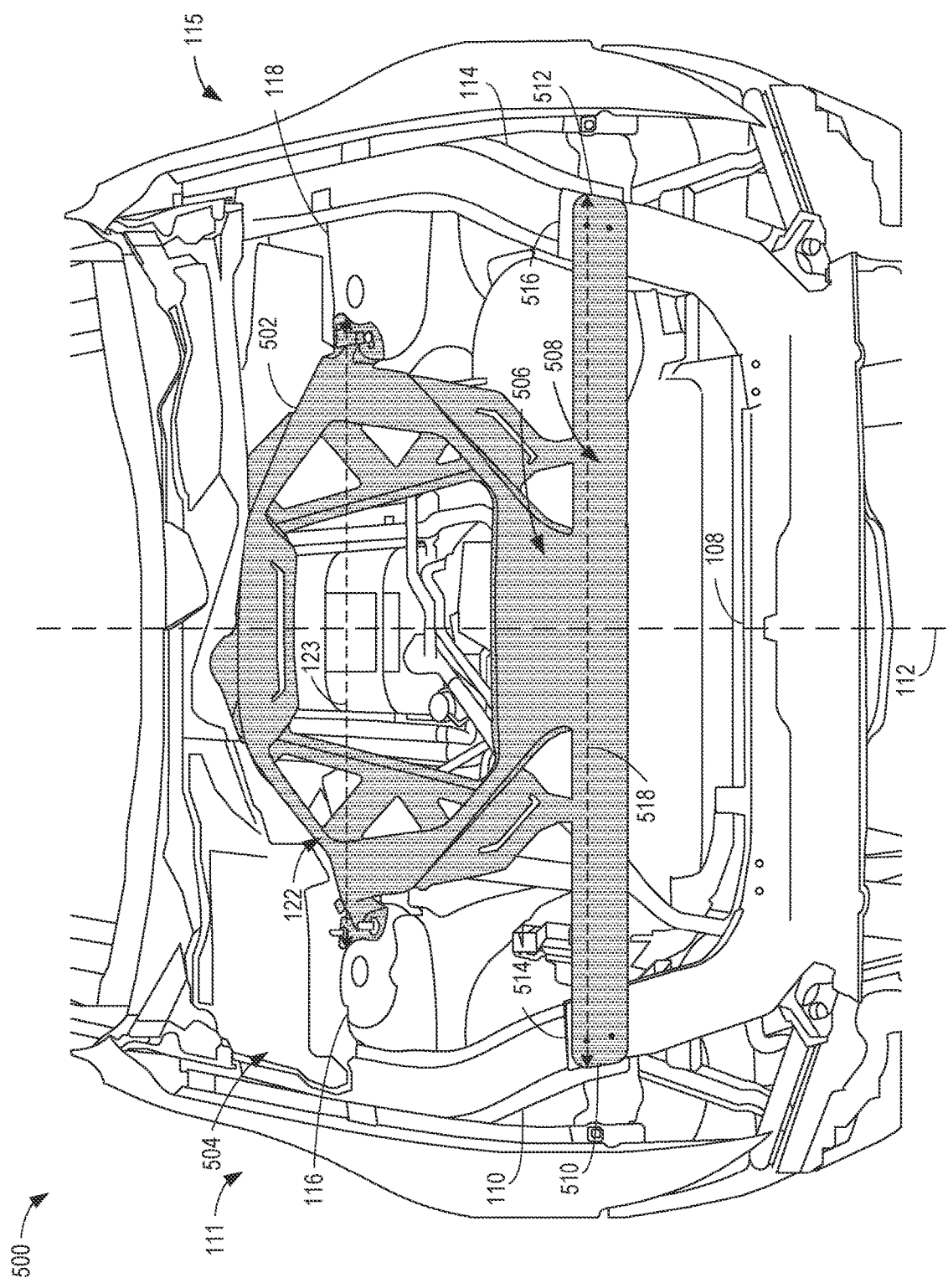
FIG. 5 illustrates a fifth example strut brace mounted in a vehicle.

FIG. 5 illustrates another vehicle 500 including a fifth example strut brace 502 mounted in an under-hood compartment 504. In FIG. 5, the fifth strut brace 502 includes a third example front-middle portion 506 and a second example front portion 508. In FIG. 5, the second front portion 508 includes another example fourth mounting point 510 removably coupled to the first longitudinal member 110 and another example fifth mounting point 512 removably coupled to the second longitudinal member 114. Thus, the second front portion 508 extends transversely between the first longitudinal member 110 and the second longitudinal member 114. In some examples, the fourth mounting point 510 and the fifth mounting point 512 are operatively coupled to the upper front rail 108 on opposite sides of the vehicle 500 in addition to the first and second longitudinal members 110, 114 to further improve a torsional rigidity of the vehicle 500. For example, the fourth mounting point 510 and the fifth mounting point 512 can be operatively coupled to respective lateral ends 514, 516 of the upper front rail 108. Accordingly, the second front portion 508 enables loads to be transferred between the first shock tower 116 and the second longitudinal member 114 as well as between the second shock tower 118 and the first longitudinal member 110. Additionally or alternatively, the second front portion 508 can extend transversely along the upper front rail 108, similar to the first front portion 126 of FIGS. 1-4, and operatively couple to the upper front rail 108 on the first side 111 and the second side 115 of the longitudinal centerline 112 to define a sixth mounting point and a seventh mounting point.

In FIG. 5, the fourth mounting point 510 and the fifth mounting point 512 are positioned further than the second mounting point 130 and the third mounting point 132 from the longitudinal centerline 112. In other words, the rear-middle portion 122 includes the second width 123 and the second front portion 508 includes a fifth width 518 greater than the second width 123.

In FIG. 5, the second front portion 508 is positioned further from a front of the vehicle 500 and, in turn, the third front-middle portion 506 includes a shortened longitudinal length compared to the first front-middle portion 124 of FIGS. 1-3 and/or the second front middle portion 406 of FIG. 4. In particular, the vehicle 500 may include a battery or some other component(s) positioned along the upper front rail 108 and, in turn, the fifth strut brace 502 avoids interfering with access thereto. Additionally or alternatively, it may be advantageous to provide space between the fifth strut brace 502 and the upper front rail 108 for energy absorption.

The foregoing examples of the strut braces can be used with vehicles. Although each example strut brace disclosed above has certain features, it should be understood that it is not necessary for a particular feature of one example strut brace to be used exclusively with that example. Instead, any of the features described above and/or depicted in the drawings can be combined with any of the examples, in addition to or in substitution for any of the other features of those examples. Features of one example are not mutually exclusive to features of another example. Instead, the scope of this disclosure encompasses any combination of any of the features.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Example methods, apparatus, systems, and articles of manufacture to increase a structural rigidity of a vehicle as well as provide coverage for components in an under-hood compartment are disclosed herein. Further examples and combinations thereof include the following:

Example 1 includes an apparatus comprising a strut brace including a first portion to removably couple to a cowl of a vehicle, a second portion to removably couple to a first shock tower on a first side of the vehicle and a second shock tower on a second side of the vehicle, and a third portion to removably couple to at least one of (i) a first longitudinal member on the first side of the vehicle and a second longitudinal member on the second side of the vehicle or (ii) an upper front rail on the first side of the vehicle and the second side of the vehicle, the third portion to traverse an axial centerline of the vehicle.

Example 2 includes the apparatus of example 1, wherein the strut brace includes a first bracket operatively coupled to the first portion, the second portion, and the third portion of the strut brace, the first bracket to be positioned on the first side of the vehicle, and a second bracket operatively coupled to the first portion, the second portion, and the third portion of the strut brace, the second bracket to be positioned on the second side of the vehicle.

Example 3 includes the apparatus of example 1, wherein the second portion of the strut brace includes a first width and the third portion of the strut brace includes a second width smaller than the first width.

Example 4 includes the apparatus of example 3, wherein the third portion of the strut brace includes a third width between the first width and the second width, the third width to be defined closer than the second width to a front of the vehicle.

Example 5 includes the apparatus of example 3, wherein the third portion of the strut brace includes a third width greater than the first width, the third width defined closer than the second width to a front of the vehicle.

Example 6 includes the apparatus of example 1, wherein the third portion of the strut brace includes at least one openable or removable cover plate.

Example 7 includes the apparatus of example 1, wherein the second portion of the strut brace includes an opening to enable access to an engine of the vehicle.

Example 8 includes a vehicle comprising a cowl defining a rear of an under-hood compartment of the vehicle, a first longitudinal member on a first side of an axial centerline of the vehicle, a second longitudinal member on a second side of the axial centerline of the vehicle, a first shock tower in the under-hood compartment on the first side, a second shock tower in the under-hood compartment on the second side, an upper front rail extending transversely along a front of the under-hood compartment, and a strut brace including a rear portion, a rear-middle portion, a front-middle portion, and a front portion, the rear portion including a first mounting point to couple to the cowl, the rear-middle portion including a second mounting point to couple to the first shock tower and a third mounting point to couple to the second shock tower, the front-middle portion traversing an axial centerline of the vehicle and connecting the rear-middle portion and the front portion, the front portion including a fourth mounting point to couple to at least one of the first longitudinal member or the upper front rail on the first side and a fifth mounting point to couple to at least one of the second longitudinal member or the upper front rail on the second side.

Example 9 includes the vehicle of example 8, further including an engine positioned in the under-hood compartment, wherein the rear-middle portion includes an opening between the second mounting point and the third mounting point to enable the engine to be accessible.

Example 10 includes the vehicle of example 9, further including a first bracket extending across the opening on the first side, and a second bracket extending across the opening on the second side.

Example 11 includes the vehicle of example 8, further including an engine positioned in the under-hood compartment, wherein the rear-middle portion covers the engine.

Example 12 includes the vehicle of example 8, wherein the front-middle portion of the strut brace includes at least one openable or removable cover plate.

Example 13 includes the vehicle of example 8, wherein the strut brace is removably coupled to the cowl, the first shock tower, the second shock tower, and (i) the upper front rail or (ii) the first and second longitudinal members via bolts.

Example 14 includes the vehicle of example 8, wherein the fourth mounting point and the fifth mounting point are positioned further from the axial centerline than the second mounting point and the third mounting point.

Example 15 includes the vehicle of example 8, wherein the front-middle portion defines at least a portion of a first load path between the second mounting point and the fifth mounting point, and wherein the front-middle portion defines at least a portion of a second load path between the third mounting point and the fourth mounting point, the first load path intersecting the second load path.

Example 16 includes the vehicle of example 8, wherein the rear-middle portion defines at least a portion of a third load path between the first mounting point and the second mounting point, and wherein the rear-middle portion defines at least a portion of a fourth load path between the first mounting point and the third mounting point.

Example 17 includes the vehicle of example 8, wherein the strut brace is to cover at least one of wires, tubes, or tanks in the under-hood compartment.

Example 18 includes an apparatus comprising a strut brace including a rear portion, a middle portion, and a front portion, the rear portion of the strut brace to removably couple to a cowl of a vehicle, the middle portion of the strut brace extending laterally outward from the rear portion, the middle portion of the strut brace to removably couple to a first shock tower and a second shock tower, the front portion of the strut brace including a first lateral end to removably couple to an upper front rail or a first longitudinal member and a second lateral end to removably couple to the upper front rail or a second longitudinal member.

Example 19 includes the apparatus of example 18, wherein the front portion includes a first front portion and a second front portion rearward of the first front portion, the second front portion extending laterally inward from the middle portion, the first front portion extending laterally outward from the second front portion.

Example 20 includes the apparatus of example 19, wherein the first front portion of the strut brace is to extend transversely along the upper front rail or between the first longitudinal member and the second longitudinal member.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
a strut brace including a first portion to removably couple to a cowl of a vehicle, a second portion to removably couple to a first shock tower on a first side of the vehicle and a second shock tower on a second side of the vehicle, and a third portion to removably couple to at least one of (i) a first longitudinal member on the first side of the vehicle and a second longitudinal member on the second side of the vehicle or (ii) an upper front rail on the first side of the vehicle and the second side of the vehicle, the third portion to traverse an axial centerline of the vehicle, the second portion of the strut brace including a first width, the third portion of the strut brace including a second width smaller than the first width.

2. The apparatus of claim 1, wherein the second portion and the third portion define (i) a first load path between the first shock tower and at least one of the second longitudinal member or the upper front rail and (ii) a second load path between the second shock tower and at least one of the first longitudinal member or the upper front rail, the first load path intersecting the second load path.

3. The apparatus of claim 1, wherein the third portion of the strut brace includes a third width between the first width and the second width, the third width to be defined closer than the second width to a front of the vehicle.

4. The apparatus of claim 1, wherein the third portion of the strut brace includes a third width greater than the first width, the third width defined closer than the second width to a front of the vehicle.

5. The apparatus of claim 1, wherein the third portion of the strut brace includes at least one openable or removable cover plate.

6. The apparatus of claim 1, wherein the second portion of the strut brace includes an opening to enable access to an engine of the vehicle.

7. A vehicle comprising:
a cowl defining a rear of an under-hood compartment of the vehicle;
a first longitudinal member on a first side of an axial centerline of the vehicle;
a second longitudinal member on a second side of the axial centerline of the vehicle;
a first shock tower in the under-hood compartment on the first side;
a second shock tower in the under-hood compartment on the second side;
an upper front rail extending transversely along a front of the under-hood compartment; and
a strut brace including a rear portion, a rear-middle portion, a front-middle portion, and a front portion, the rear portion including a first mounting point to couple to the cowl, the rear-middle portion including a second mounting point to couple to the first shock tower and a third mounting point to couple to the second shock tower, the front-middle portion traversing an axial centerline of the vehicle and connecting the rear-middle portion and the front portion, the front portion including a fourth mounting point to couple to at least one of the first longitudinal member or the upper front rail on the first side and a fifth mounting point to couple to at least one of the second longitudinal member or the upper front rail on the second side.

8. The vehicle of claim 7, further including an engine positioned in the under-hood compartment, wherein the rear-middle portion includes an opening between the second mounting point and the third mounting point to enable the engine to be accessible.

9. The vehicle of claim 8, further including:
  a first bracket extending across the opening on the first side; and
  a second bracket extending across the opening on the second side.

10. The vehicle of claim 7, further including an engine positioned in the under-hood compartment, wherein the rear-middle portion covers the engine.

11. The vehicle of claim 7, wherein the front-middle portion of the strut brace includes at least one openable or removable cover plate.

12. The vehicle of claim 7, wherein the strut brace is removably coupled to the cowl, the first shock tower, the second shock tower, and (i) the upper front rail or (ii) the first and second longitudinal members via bolts.

13. The vehicle of claim 7, wherein the fourth mounting point and the fifth mounting point are positioned further from the axial centerline than the second mounting point and the third mounting point.

14. The vehicle of claim 7, wherein the front-middle portion defines at least a portion of a first load path between the second mounting point and the fifth mounting point, and wherein the front-middle portion defines at least a portion of a second load path between the third mounting point and the fourth mounting point, the first load path intersecting the second load path.

15. The vehicle of claim 7, wherein the rear-middle portion defines at least a portion of a third load path between the first mounting point and the second mounting point, and wherein the rear-middle portion defines at least a portion of a fourth load path between the first mounting point and the third mounting point.

16. The vehicle of claim 7, wherein the strut brace is to cover at least one of wires, tubes, or tanks in the under-hood compartment.

17. An apparatus comprising:
  a strut brace including a rear portion, a middle portion, and a front portion, the rear portion of the strut brace to removably couple to a cowl of a vehicle, the middle portion of the strut brace extending laterally outward from the rear portion, the middle portion of the strut brace to removably couple to a first shock tower and a second shock tower, the front portion of the strut brace including a first lateral end to removably couple to an upper front rail or a first longitudinal member and a second lateral end to removably couple to the upper front rail or a second longitudinal member.

18. The apparatus of claim 17, wherein the front portion includes a first front portion and a second front portion rearward of the first front portion, the second front portion extending laterally inward from the middle portion, the first front portion extending laterally outward from the second front portion.

19. The apparatus of claim 18, wherein the first front portion of the strut brace is to extend transversely along the upper front rail or between the first longitudinal member and the second longitudinal member.

* * * * *